(12) United States Patent
Barrick et al.

(10) Patent No.: US 10,704,573 B2
(45) Date of Patent: Jul. 7, 2020

(54) SYSTEM AND METHOD FOR REPHASING FLUID-DRIVEN ACTUATORS

(71) Applicant: CNH Industrial Canada, Ltd., Saskatchewan (CA)

(72) Inventors: Christopher Barrick, Morton, IL (US); John Endsley, Washington, IL (US); James W. Henry, Saskatchewan (CA); Tracey Meiners, Mackinaw, IL (US); Kevin McKee, Naperville, IL (US); Klint Peterson, Mackinaw, IL (US)

(73) Assignee: CNH Industrial Canada, Ltd., Saskatoon, Saskatchewan (CA)

(*) Notice: Subject to any disclaimer, the term of this patent is extended or adjusted under 35 U.S.C. 154(b) by 231 days.

(21) Appl. No.: 15/689,119

(22) Filed: Aug. 29, 2017

(65) Prior Publication Data
US 2019/0063473 A1    Feb. 28, 2019

(51) Int. Cl.
*A01B 63/22* (2006.01)
*F15B 19/00* (2006.01)
(Continued)

(52) U.S. Cl.
CPC ............ *F15B 19/002* (2013.01); *A01B 63/22* (2013.01); *A01B 63/32* (2013.01); *A01B 76/00* (2013.01);
(Continued)

(58) Field of Classification Search
CPC ....... A01B 63/002; A01B 63/22; A01B 63/32; A01B 73/02
(Continued)

(56) References Cited

U.S. PATENT DOCUMENTS

| 4,306,732 A | 12/1981 | Pettibone |
| 4,413,685 A | 11/1983 | Gremelspacher et al. |

(Continued)

FOREIGN PATENT DOCUMENTS

CA   1043003   11/1978

OTHER PUBLICATIONS

MIT Agrifood Research Finland "Automatic Working Depth Control for Seed Drill Using ISO 11783 Compatible Tractor".
(Continued)

*Primary Examiner* — Gary S Hartmann
(74) *Attorney, Agent, or Firm* — Rebecca L. Henkel; Rickard K. DeMille

(57) ABSTRACT

In one aspect, a system for rephasing fluid-driven actuators includes a plurality of fluid-driven actuators fluidly coupled together in series. A controller is configured to monitor a position differential existing between current positions of rods of the actuators relative to a differential threshold based on sensor measurements. The actuators are out-of-phase when the monitored differential exceeds the threshold. The controller is also configured to initiate a flow of fluid to the actuators to rephase the actuators when the monitored differential exceeds the threshold. The controller is further be configured to continue to monitor the differential following initiation of the flow of fluid to the actuators. Additionally, the controller is configured to implement a control action associated with terminating the rephasing of the actuators when the monitored differential remains constant after a first time period has elapsed following initiation of the flow of fluid.

18 Claims, 5 Drawing Sheets

(51) Int. Cl.
  *F15B 9/03* (2006.01)
  *A01B 76/00* (2006.01)
  *A01B 63/32* (2006.01)
  *F15B 11/22* (2006.01)
  *A01B 63/00* (2006.01)

(52) U.S. Cl.
  CPC ............... *F15B 9/03* (2013.01); *F15B 11/22* (2013.01); *F15B 19/005* (2013.01); *A01B 63/002* (2013.01); *F15B 2211/6336* (2013.01); *F15B 2211/7053* (2013.01); *F15B 2211/7107* (2013.01); *F15B 2211/7121* (2013.01); *F15B 2211/7656* (2013.01); *F15B 2211/782* (2013.01); *F15B 2211/857* (2013.01); *F15B 2211/87* (2013.01)

(58) Field of Classification Search
  USPC ............................................................ 172/2
  See application file for complete search history.

(56) References Cited

U.S. PATENT DOCUMENTS

| | | | |
|---|---|---|---|
| 4,506,898 A | 3/1985 | Herron | |
| 5,348,101 A * | 9/1994 | Fox | A01B 63/22 |
| | | | 172/2 |
| 5,957,218 A | 9/1999 | Noonan et al. | |
| 6,000,315 A | 12/1999 | Graham et al. | |
| 6,076,611 A | 6/2000 | Rozendaal et al. | |
| 6,085,846 A | 7/2000 | Buchl et al. | |
| 6,164,385 A | 12/2000 | Buchl | |
| 6,698,523 B2 | 3/2004 | Barber | |
| 7,469,648 B2 | 12/2008 | Bettin | |
| 8,162,070 B2 | 4/2012 | Smith et al. | |
| 8,201,637 B2 | 6/2012 | Ripple | |
| 8,555,635 B2 * | 10/2013 | Webster | F15B 11/22 |
| | | | 60/546 |
| 8,857,530 B2 | 10/2014 | Henry | |
| 10,251,327 B2 * | 4/2019 | Henry | A01B 63/22 |
| 10,405,478 B2 * | 9/2019 | Henry | A01B 73/02 |
| 2015/0156951 A1 | 6/2015 | Henry et al. | |
| 2015/0334914 A1 | 11/2015 | Zielke | |
| 2016/0157413 A1 | 6/2016 | Kowalchuk et al. | |
| 2017/0006758 A1 | 1/2017 | Dienst et al. | |
| 2019/0003495 A1 * | 1/2019 | Hunt | A01D 57/04 |

OTHER PUBLICATIONS

P. Suomi, et al. 7$^{th}$ European Conference on Precision Agriculture, Wageningen, the Netherlands. Multiple Reference Dates (8 pages).

* cited by examiner

SYSTEM AND METHOD FOR REPHASING FLUID-DRIVEN ACTUATORS

FIELD

The present disclosure generally relates to agricultural implements and, more particularly, to systems and methods for rephasing fluid-driven actuators of an agricultural implement in which a position differential between the current positions of rods of such actuators is monitored during the rephasing process.

BACKGROUND

Agricultural implements generally include various fluid-driven actuators, such as hydraulic actuators, for adjusting the relative positioning between certain components of the implement. For example, actuators may be used to adjust the positions of wheels of the implement relative to a frame of the implement. Specifically, the actuators may move the wheels between an operating position, where ground-engaging tools of the implement are positioned so as to engage the soil, and a non-operating position, where the ground-engaging tools are lifted up so as to permit storage and/or transportation on a road.

Several of the actuators on the implement may be fluidly coupled together in series so as to be operated by a single fluid power source and associated control valve. In such circuit configurations, each actuator, when properly designed, extends and retracts in a generally synchronized manner. However, the presence of air in the circuit and/or leakage of fluid past pistons of the actuators may cause the actuators to become unsynchronized. In such instance, the actuators are considered to be out-of-phase relative to one another, thereby requiring a corrective action to be performed to prevent undesirable operation. For example, if the actuators coupled to the wheels become out-of-phase, the frame of the implement may be oriented at an angle relative to the ground. This can lead to the ground-engaging tools of the implement penetrating the ground at differing depths, thereby resulting in the formation of an uneven seedbed.

Accordingly, an improved system and method for rephasing fluid-driven actuators of an agricultural implement would be welcomed in the technology.

BRIEF DESCRIPTION

Aspects and advantages of the technology will be set forth in part in the following description, or may be obvious from the description, or may be learned through practice of the technology.

In one aspect, the present subject matter is directed to a system for rephasing fluid-driven actuators. The system may include an agricultural implement having a plurality of fluid-driven actuators fluidly coupled together in series. Each fluid-driven actuator may include a cylinder and a rod movable relative to the cylinder. The system may also include a plurality of sensors, with each sensor being provided in operative association with one of the fluid-driven actuators. Each sensor may be configured to detect a parameter indicative of a current position of the rod relative to the cylinder of the associated fluid-driven actuator. Additionally, the system may include a controller communicatively coupled to the sensors. The controller may be configured to monitor a position differential existing between the current positions of the rods of the fluid-driven actuators relative to a differential threshold based on sensor measurements provided by the sensors. The fluid-driven actuators may be out-of-phase when the monitored position differential exceeds the differential threshold. The controller may also be configured to initiate a flow of fluid to the fluid-driven actuators to rephase the fluid-driven actuators when the monitored position differential exceeds the differential threshold. The controller may further be configured to continue to monitor the position differential following initiation of the flow of fluid to the fluid-driven actuators. Additionally, the controller may be configured to implement a control action associated with terminating the rephasing of the fluid driven actuators when the monitored position differential remains constant after a first time period has elapsed following initiation of the flow of fluid.

In another aspect, the present subject matter is directed to a method for rephasing fluid-driven actuators of an agricultural implement. The agricultural implement may include a plurality of fluid-driven actuators fluidly coupled together in series. Each fluid-driven actuator may include a cylinder and a rod movable relative to the cylinder. The method may include receiving, with a computing device, data indicative of a current position of the rod relative to the cylinder of each fluid-driven actuator. The method may further include monitoring, with the computing device, a position differential existing between the current positions of the rods of the fluid-driven actuators relative to differential threshold. The plurality of fluid-driven actuators may be out-of-phase when the monitored position differential exceeds the differential threshold. The method may also include initiating, with the computing device, a flow of fluid to the fluid-driven actuators to rephase the fluid-driven actuators when the monitored position differential exceeds the differential threshold. The method may further include continuing to monitor, with the computing device, the position differential following initiation of the flow of fluid to the fluid-driven actuators. Additionally, the method may further include initiating, with the computing device, a control action associated with terminating the rephasing of the fluid-driven actuators when the monitored position differential remains constant after a first time period has elapsed following initiation of the flow of fluid.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
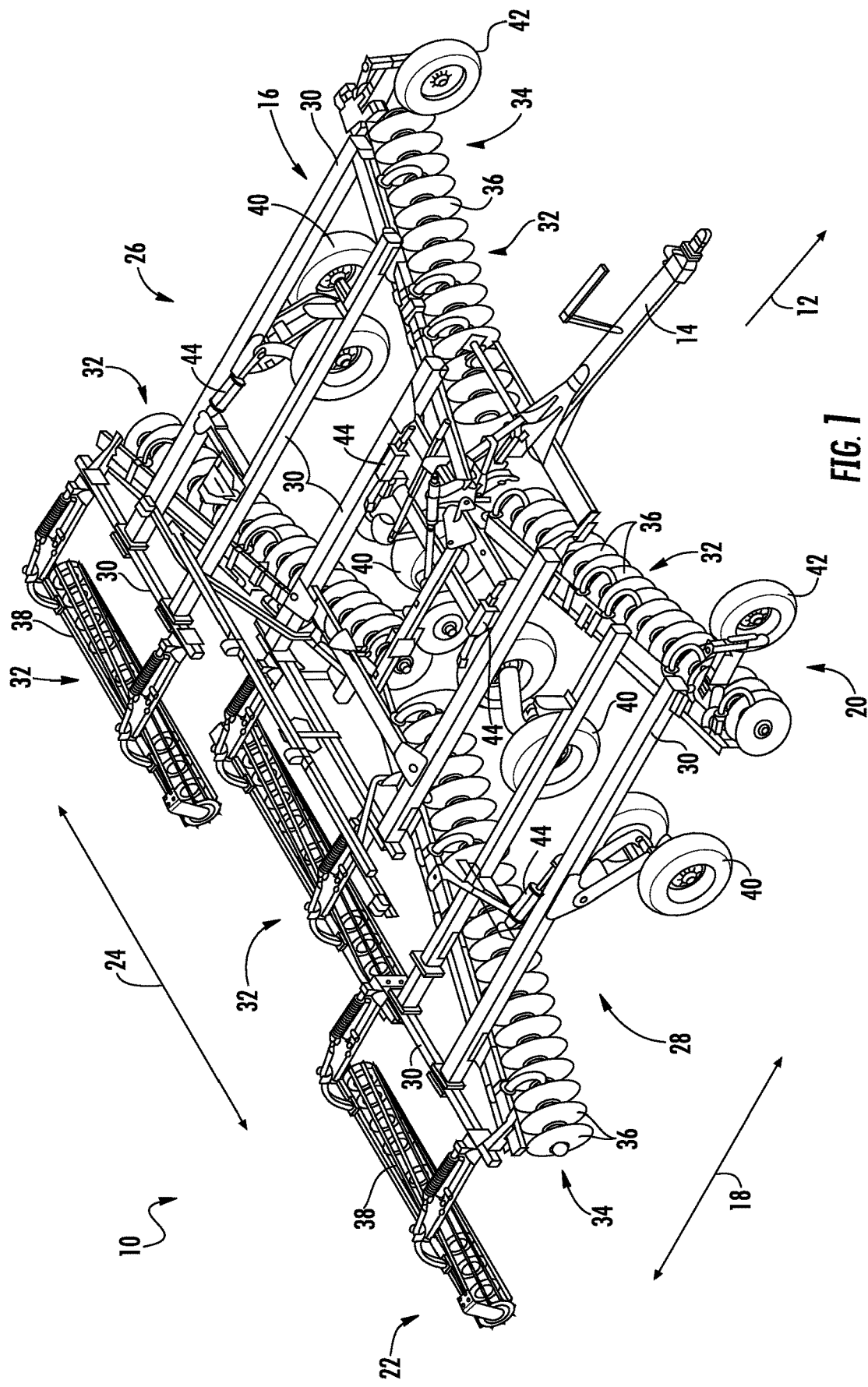
FIG. 1 illustrates a perspective view of one embodiment of an agricultural implement in accordance with aspects of the present subject matter.

Repeat use of reference characters in the present specification and drawings is intended to represent the same or analogous features or elements of the present technology.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for rephasing fluid-driven actuators of an agricultural implement. Specifically, in several embodiments, each fluid-driven actuator of the system may include a rod that is configured to be actuated relative to an associated cylinder. Additionally, a controller of the disclosed system may monitor a current position of each rod relative to its associated cylinder for each of the fluid-driven actuators so as to determine a position differential extending between the current positions of the rods of the various actuators. The controller may then be configured to compare the determined position differential to a differential threshold defined for the actuators. If the position differential exceeds the differential threshold, the controller may determine that the actuators are out-of-phase. For example, the actuators may be coupled between various wheel assemblies of the implement and a corresponding frame of the implement. When the actuators are out-of-phase, the rod of the actuator coupled to one wheel assembly may extend a different distance from its associated cylinder than the rod of the actuator coupled to another wheel assembly. As such, the frame of the implement may be oriented at an angle relative to the ground such that ground-engaging tools of the implement penetrate the soil to differing depths.

Additionally, in accordance with aspects of the present subject matter, when it is determined that the monitored position differential exceeds the differential threshold (i.e., that the actuators are out-of-phase), the controller may be configured to initiate a flow of fluid to the actuators to rephase the actuators such that their rods extend and retract from their associated cylinders in unison. As fluid is supplied to the actuators, the controller may continue to monitor the position differential existing between the current positions of the rods. In doing so, if the monitored position differential does not change after a specified time period has elapsed following initiation of the rephasing flow of fluid, it may be determined that various components of the implement and/or the system may not be functioning correctly. When this occurs, the controller may be configured to terminate the rephasing operation, such as by occluding the flow of fluid to the actuators. This may prevent damage to the implement and/or the system (e.g., pumps, valves, etc.).

Referring now to FIG. 1, a perspective view of one embodiment of an agricultural implement 10 is illustrated in accordance with aspects of the present subject matter. In general, the implement 10 may be configured to be towed along a direction of travel 12 by a work vehicle (not shown), such as a tractor or other agricultural work vehicle. For example, the work vehicle may be coupled to the implement 10 via a hitch assembly 14 or using any other suitable attachments means. As shown, the hitch assembly 14 may be coupled to a frame 16 of the implement 10 to facilitate towing the implement 10 in the direction of travel 12.

As shown, the frame 16 may extend in a longitudinal direction (e.g., as indicated by arrow 18 in FIG. 1) between a forward end 20 and an aft end 22. The frame 16 may also extend in a lateral direction (e.g., as indicated by arrow 24 in FIG. 1) between a first side 26 and a second side 28. In addition, the frame 16 may generally include a plurality of structural frame members 30, such as beams, bars, and/or the like, configured to support or couple to a plurality of components, such as various ground-engaging elements 32.

For example, in one embodiment, the frame 16 may be configured to support one or more gangs or sets 34 of disk blades 36. In such an embodiment, each disk blade 36 may, for example, include both a concave side (not shown) and a convex side (not shown). In addition, the gangs 34 of disk blades 36 may be oriented at an angle relative to the travel direction 12 to promote more effective tilling of the soil. However, it should be appreciated that the frame 16 may support any suitable ground-engaging tool 32 or combination of ground-engaging tools 32. For example, in alternate embodiments, the frame 16 may support various shanks, leveling blades, tines, and/or the like.

Moreover, in one embodiment, the implement 10 may optionally include additional ground-engaging tools 32, such as one or more baskets or rotary firming wheels 38. As is generally understood, the baskets 38 may be configured to reduce the number of clods in the soil and/or firm the soil over which the implement 10 travels. As shown, each basket 38 may be configured to be pivotally coupled to one of the frame 16. Alternately, the baskets 38 may be configured to be pivotally coupled to any other suitable location of the implement 10, such as a harrow (not shown) coupled to the frame 16. It should be appreciated that the implement 10 may include any suitable number of baskets 38. In fact, some embodiments of the implement 10 may not include any baskets 38.

The implement 10 may further include various wheel assemblies coupled to the frame 16 to support the frame 16 relative to the ground and to facilitate towing the implement 10 in the direction of travel 12. Specifically, in several embodiments, the implement 10 may include a plurality of center support wheel assemblies 40 located centrally on the implement's frame 16 between its forward and aft ends 20, 22, with the center support wheel assemblies 40 being spaced apart from one another in the lateral direction 24 of the implement 10 between its first and second sides 26, 28. In addition, the implement 10 may also include a plurality of forward support wheel assemblies 42 coupled to the frame 16 proximate to the forward end 20 of the frame 16, with the forward support wheel assemblies 42 being spaced apart from one another in the lateral direction 24 of the implement 10 between its first and second sides 26, 28. As shown in FIG. 1, the forward support wheel assemblies 42 may be spaced apart from the center support wheel assemblies 40 in the longitudinal direction 18 of the implement 10. It should be appreciated that the implement 10 may include any suitable number and/or type of wheel assemblies in alternate embodiments.

Additionally, the implement 10 may also include any suitable number of actuators for adjusting the relative positioning between various components of the implement 10. For instance, as shown, the implement 10 may include a plurality of fluid-driven actuators 44 coupled between the center support wheel assemblies 40 and the frame 16 for raising and lowering the frame 16 relative to the ground, thereby allowing the penetration depth and/or the down pressure of the disks 36 to be adjusted. In alternate embodiments, the implement 10 may include additional actuators 44 for adjusting the relative positioning between other components, such as between the front support wheel assemblies 42 and the frame 16 or between the gangs 34 of disk blades 36 and the frame 16.

It should be appreciated that the configuration of the implement 10 described above and shown in FIG. 1 is provided only to place the present subject matter in an exemplary field of use. Thus, it should be appreciated that the present subject matter may be readily adaptable to any manner of implement configuration.

Figure 2:
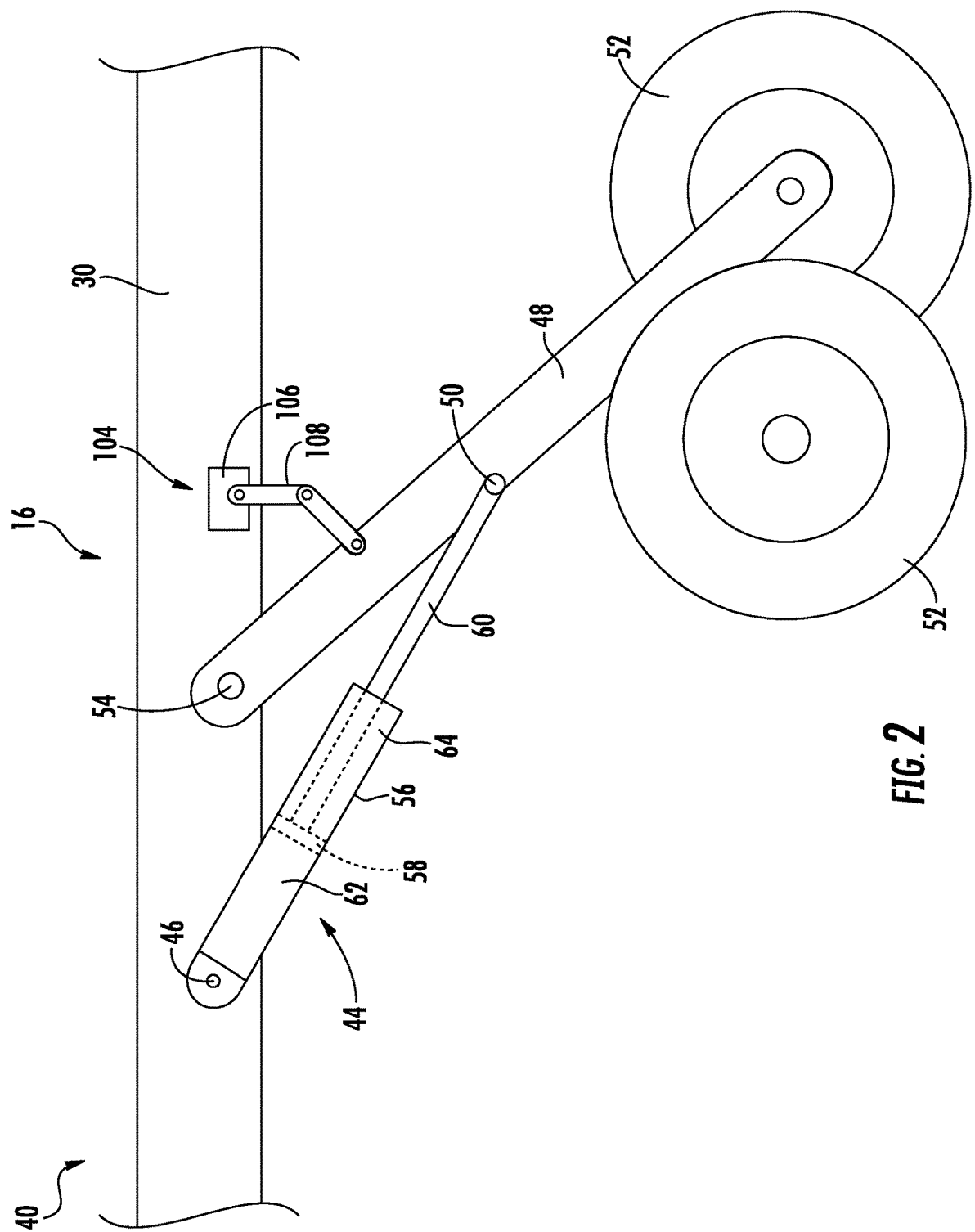
FIG. 2 illustrates a side view of one embodiment of a wheel assembly in accordance with aspects of the present subject matter, particularly illustrating a rotary sensor for detecting a current position of a rod of an associated fluid-driven actuator relative to a cylinder of such fluid-driven actuator.

Referring now to FIG. 2, a side view of an exemplary embodiment of one of the center wheel assemblies 40 shown in FIG. 1 is illustrated in accordance with aspects of the present subject matter. Specifically, in several embodiments, the wheel assembly 40 may be configured to be pivotable or otherwise moveable relative to the frame 16 of the implement 10 to permit one or more associated actuators 44 to adjust the position of the wheel assembly 40 relative to the frame 16. For example, in one embodiment, one end of the actuator 44 may be pivotably coupled to one of the frame members 30 of the frame 16 at a pivot joint 46. Similarly, an opposed end of the actuator 44 may also be coupled to a pivot arm 48 of the wheel assembly 40 at a pivot joint 50. The pivot arm 48, which may rotatably support one or more wheels 52, may, in turn, be coupled to one of the frame members 30 of the frame 16 at a pivot joint 54. As such, the pivot joints 46, 50, 54 may allow relative pivotable movement between the frame member 30, the wheel assembly 40, and the actuator 44, thereby allowing the position of the wheel assembly 40 relative to the frame 16 to be adjusted. However, a person of ordinary skill in the art would appreciate that the wheel assembly 40 may be adjustably coupled to the frame 16 in any suitable manner that permits the actuator 44 to move the wheel assembly 40 relative to the frame 16.

As shown, the actuator 44 may correspond to a hydraulic actuator. Thus, in several embodiments, the actuator 44 may include a cylinder 56 configured to house a piston 58 and a rod 60 coupled to the piston 58 that extends outwardly from the cylinder 56. Additionally, the actuator 44 may include a cap-side chamber 62 and a rod-side chamber 64 defined within the cylinder 56. As is generally understood, by regulating the pressure of the fluid supplied to one or both of the cylinder chambers 62, 64, the actuation of the rod 60 may be controlled. As shown in FIG. 2, in the illustrated embodiment, the end of the rod 60 is coupled to the arm 48 at the pivot joint 50 while the cylinder 56 is coupled to the frame member 30 at the opposed pivot joint 46. However, in an alternative embodiment, the end of the rod 60 may be coupled to the frame member 30 at pivot joint 46 while the cylinder 56 may be coupled to the arm 48 at pivot joint 50. It should be appreciated that the actuator 44 may be any suitable type of actuator.

Figure 3:
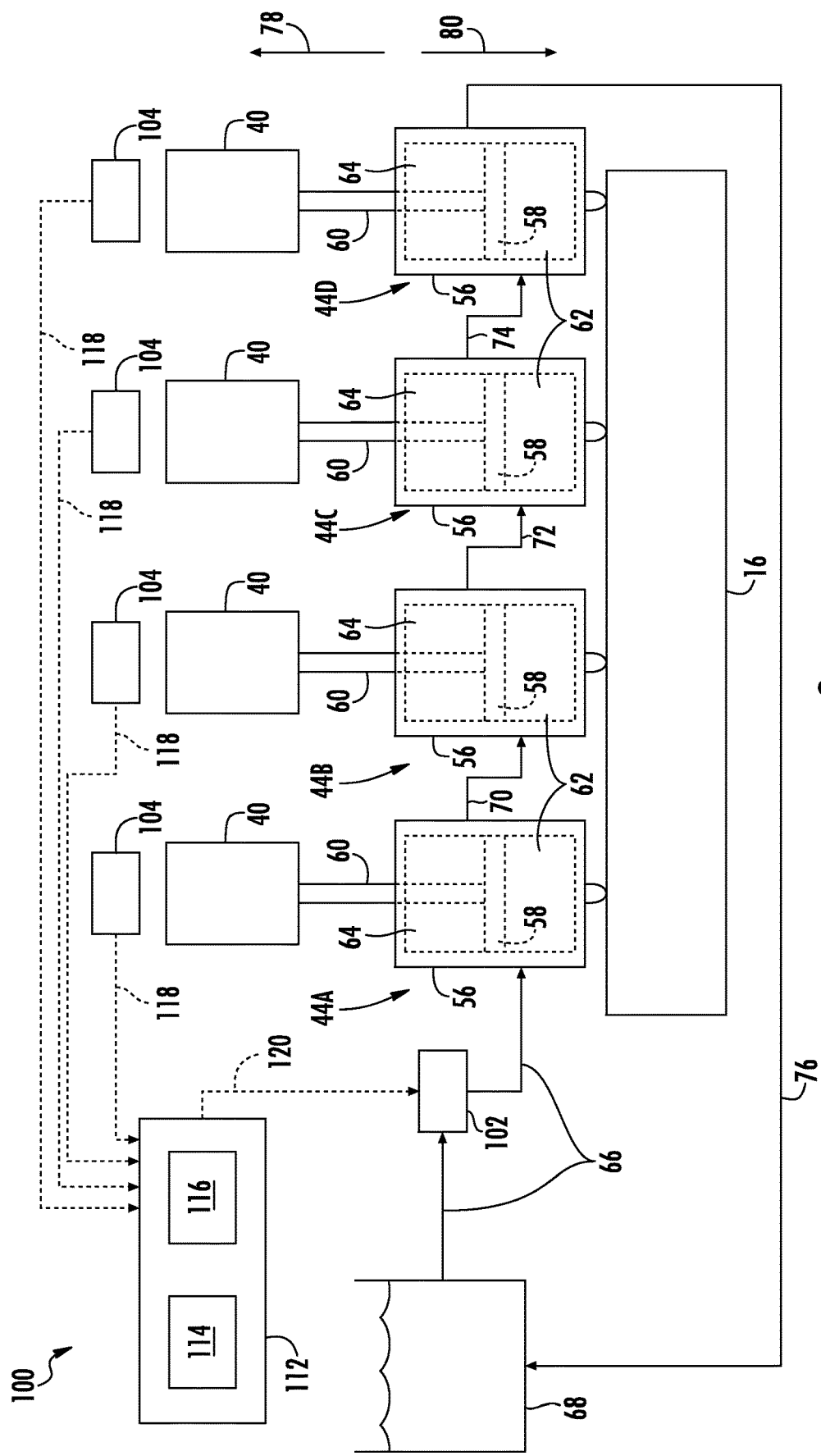
FIG. 3 illustrates a schematic view of one embodiment of a system for rephasing fluid-driven actuators of an agricultural implement in accordance with aspects of the present subject matter.

Referring now to FIG. 3, a schematic view of one embodiment of a system 100 for rephasing fluid-driven actuators of an agricultural implement is illustrated in accordance with aspects of the present subject matter. In general, the system 100 will be described herein with reference to the implement 10 and the wheel assembly 40 described above with reference to FIGS. 1 and 2. However, it should be appreciated by those of ordinary skill in the art that the disclosed system 100 may generally be utilized with implements having any other suitable implement configuration and/or wheel assemblies having any other suitable wheel assembly configuration.

As shown in FIG. 3, the system 100 may include a plurality of the actuators 44A-D. In the one embodiment, the actuators 44A-D may correspond to the four actuators 44 coupled between the wheel assemblies 40 and the frame 16 of the implement 10 described above with reference to FIGS. 1 and 2. However, in alternative embodiments, the actuators 44A-D may correspond to any other suitable actuators 44 coupled between components of the implement 10, such as between the front support wheel assemblies 42 and the frame 16 or between the gangs 34 of disk blades 36 and the frame 16. It should be appreciated that the system 100 may include any suitable number of actuators 44 so long as the system 100 includes at least two actuators 44.

In several embodiments, the actuators 44A-D may be fluidly coupled together in series. For example, a first fluid conduit 66 may fluidly couple a fluid reservoir 68 to the cap-side chamber 62 of the actuator 44A. Similarly, a second fluid conduit 70 may fluidly couple the rod-side chamber 64 of the actuator 44A to the cap-side chamber 62 of the actuator 44B. Moreover, a third fluid conduit 72 may fluidly couple the rod-side chamber 64 of the actuator 44B to the cap-side chamber 62 of the actuator 44C. Furthermore, a fourth fluid conduit 74 may fluidly couple the rod-side chamber 50 of the actuator 44C to the cap-side chamber 62 of the actuator 44D. Additionally, a fifth fluid conduit 76 may fluidly couple the rod-side chamber 50 of the actuator 44D to the fluid reservoir 56. It should be appreciated that, in alternative embodiments, the first conduit 66 may fluidly couple the reservoir 68 and the rod-side chamber 64 of the actuator 44A, the second conduit 70 may fluidly couple the cap-side chamber 62 of the actuator 44A and the rod-side chamber 64 of the actuator 44B, the third conduit 72 may fluidly couple the cap-side chamber 62 of the actuator 44B and the rod-side chamber 64 of the actuator 44C, the fourth conduit 74 may fluidly couple the cap-side chamber 62 of the actuator 44C and the rod-side chamber 64 of the actuator 44D, and the fifth conduit 76 may fluidly couple the cap-side chamber 62 of the actuator 44D and the reservoir 68. As such, the actuators 44A, 44B, 44C, 44D may be rephasing actuators that include any suitable passage, orifice, channel, valve and/or the like that is configured to rephase the actuator.

Additionally, the system 100 may include a suitable pressure regulating valve 102 (PRV) (e.g., a solenoid-activated valve) configured to regulate a supply of fluid (e.g., hydraulic fluid) from the reservoir 68 to the actuator 44A. As shown in FIG. 3, in one embodiment, the PRV 102 may be positioned along the length of the first fluid conduit 66 so as to be in fluid communication with the cap-side chamber 62 of the actuator 44A. For example, the PRY 102 may permit a volume of fluid to flow from the reservoir 68 through the first fluid conduit 66 to the cap-side chamber 62 of the actuator 44A, thereby moving the associated piston 58 in a first direction (e.g., as indicated by arrow 78 in FIG. 3) and extending the associated rod 60. The movement of this piston 58 displaces a volume of fluid from the rod-side chamber 64 of the actuator 44A, which flows through the second conduit 70 to the cap-side chamber 62 of the actuator 44B. The volume of fluid supplied to the actuator 44B, in turn, moves the associated piston 58 and rod 60 in the direction 78, thereby displacing a volume of fluid from the rod-side chamber 64 of the actuator 44B. This fluid flows through the third conduit 72 to the cap-side chamber 62 of the actuator 44C, thereby moving the associated piston 58 and rod 60 in the direction 78. The movement of the piston 58 of the actuator 44C displaces a volume of fluid from the associated rod-side chamber 64, which flows through the fourth conduit 74 to the cap-side chamber 62 of the actuator 44D. The volume of fluid supplied to the actuator 44D, in turn, moves the associated piston 58 and rod 60 in the direction 78, thereby displacing a volume of fluid from the associated rod-side chamber 64. The displaced fluid from the actuator 44D is returned to the reservoir 68 via the fifth fluid conduit 76 in the embodiment shown in FIG. 3. In alternative embodiments, however, the fluid displaced from the rod-side chamber 64 of the actuator 44D may be supplied to an additional, adjacent actuator (if included). In operation, the rods 60 of the actuators 44A-D move simultaneously. A person of ordinary skill in the art would appreciate that the rods 60 of the actuators 44A-D may be retracted or moved in a second direction (e.g., as indicated by arrow 80 in FIG. 3) in a similar manner by supplying fluid to the rod-side chamber 64 of the actuator 44D.

In accordance with aspects of the present subject matter, the system 100 may also include a plurality of sensors 104, with each sensor 104 being provided in operative association with one of the plurality of actuators 44A-D. In general, the sensors 104 may be configured to detect a parameter indicative of a current position of the rod 60 relative to the cylinder 56 for the associated actuator 44A-D.

Referring back to FIG. 2, in several embodiments, the sensor 104 may be configured as a rotary sensor 106 (e.g., a rotary potentiometer or a magnetic rotary sensor). Specifically, in one embodiment, the rotary sensor 106 may be coupled to one of the frame 16 or the wheel assembly 40 and an associated sensor linkage 108 coupled between the rotary sensor 106 and the other of the frame 16 or the wheel assembly 40. For instance, as shown in the illustrated embodiment, the rotary sensor 106 is coupled to a frame member 30 of the frame 16, with the sensor linkage 108 being coupled between the rotary sensor 106 and the pivot arm 48 of the wheel assembly 40. As such, when the wheel assembly 40 pivots relative to the frame 16, the motion of wheel assembly 40 may be detected by the rotary sensor 106 via the mechanical linkage provided by the sensor linkage 108. It should be appreciated that the rotary sensor 106 may have any suitable configuration.

Figure 4:
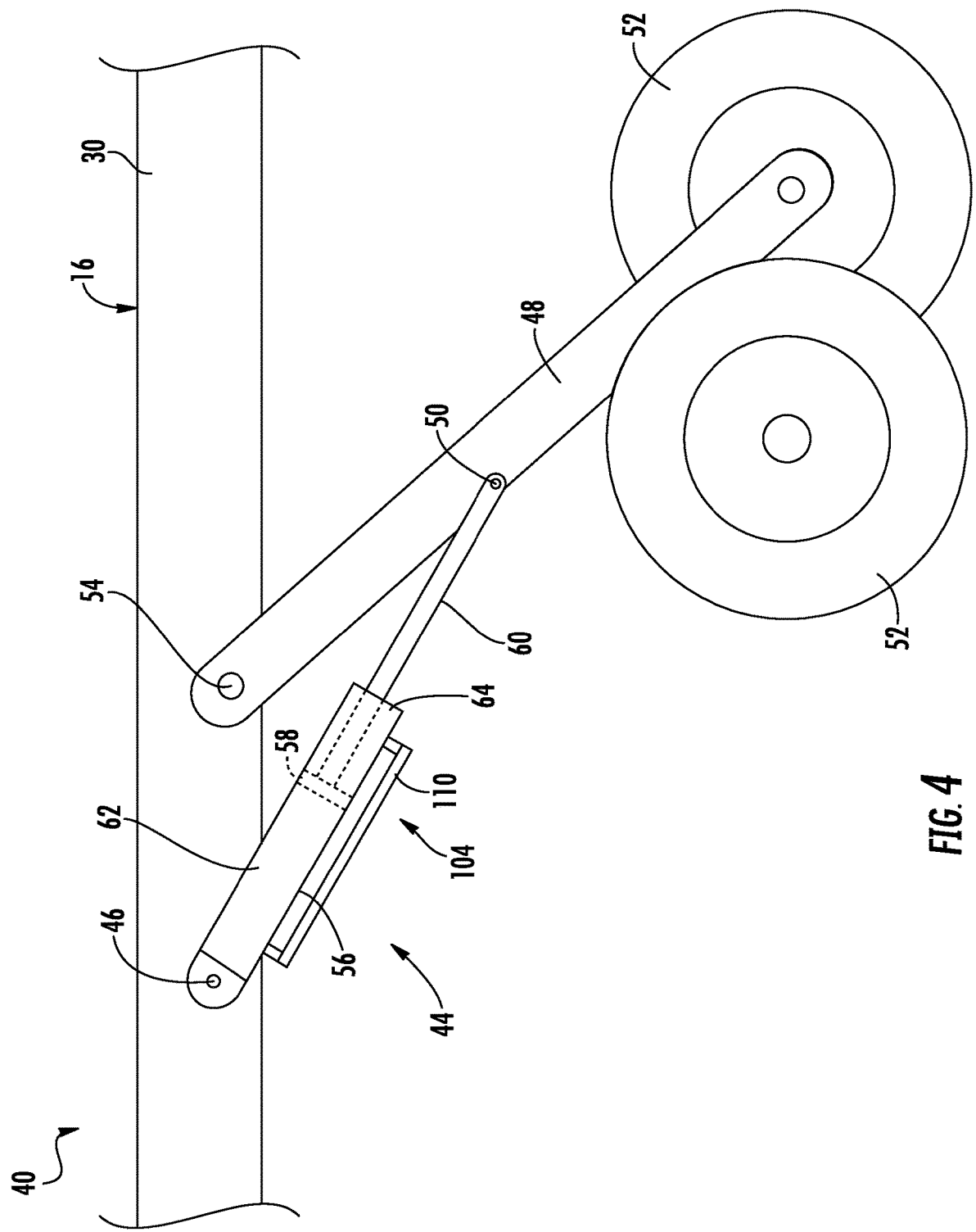
FIG. 4 illustrates a side view of another embodiment of a wheel assembly in accordance with aspects of the present subject matter, particularly illustrating a linear sensor for detecting a current position of an associated rod of a fluid-driven actuator relative to a cylinder of such fluid-driven actuator.

Referring now to FIG. 4, a side view of another embodiment of the wheel assembly 40 described above with reference to FIG. 2 is illustrated in accordance with aspects of the present subject matter. As shown, the wheel assembly 40 may generally be configured the same as or similar to that described above with reference to FIG. 2. Thus, a sensor 104 may be provided in operative association with the wheel assembly 40 for detecting a parameter indicative of a current position of the rod 60 relative to the cylinder 56 for the associated actuator 44. However, as shown in FIG. 4, unlike the above-described embodiment, the sensor 104 may be configured as a linear sensor 110. For instance, in the illustrated embodiment, the linear sensor 110 may correspond to a Hall Effect sensor coupled to the exterior of the cylinder 56. As such, when the piston 58 moves within the cylinder 56, a magnet (not shown) within the piston 58 creates a magnetic field, which the Hall Effect sensor uses to detect the current position of the rod 60 relative to the cylinder 56. It should be appreciated that the linear sensor 110 may have any suitable configuration.

A person of ordinary skill in the art would appreciate that the sensor 104 may correspond to any other suitable sensor(s) or sensing device(s) configured to detect a parameter indicative of a current position of the rod 60 relative to the cylinder 56 for the associated actuator 44.

Referring back to FIG. 3, the system 100 may further include a controller 112 configured to electronically control the operation of one or more components of the implement 10. In general, the controller 112 may comprise any suitable processor-based device known in the art, such as a computing device or any suitable combination of computing devices. Thus, in several embodiments, the controller 112 may include one or more processor(s) 114 and associated memory device(s) 116 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 116 of the controller 112 may generally comprise memory element(s) including, but not limited to, a computer readable medium (e.g., random access memory (RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 116 may generally be configured to store suitable computer-readable instructions that, when implemented by the processor(s) 114, configure the controller 112 to perform various computer-implemented functions, such as one or more aspects of the methods 200 described below with reference to FIG. 5. In addition, the controller 112 may also include various other suitable components, such as a communications circuit or module, one or more input/output channels, a data/control bus and/or the like.

It should be appreciated that the controller 112 may correspond to an existing controller of the implement 10 or the controller 112 may correspond to a separate processing device. For instance, in one embodiment, the controller 112 may form all or part of a separate plug-in module that may be installed within the implement 10 to allow for the disclosed system and method to be implemented without requiring additional software to be uploaded onto existing control devices of the implement 10.

In several embodiments, the controller 112 may be configured to monitor a current position of the rod 60 relative to the associated cylinder 56 for each of the actuators 44A-D. Specifically, the controller 112 may be communicatively coupled to the sensors 104, such as the rotary sensors 106 or the linear sensors 110, via a wired or wireless connection to allow measurement signals (e.g., indicated by dashed lines 118 in FIG. 3) to be transmitted from each sensor 104 to the controller 112. The controller 112 may then be configured determine or estimate the current position of the rod 60 relative to the associated cylinder 56 for each actuator 444-D based on the measurement signals 118 received from the associated sensor 106. For instance, the controller 112 may include a look-up table or suitable mathematical formula stored within its memory 116 that correlates the sensor measurements to the current positions of the rods 60. Once the current positions of the rods 60 are determined, the controller 112 may then be configured to determine a position differential existing between the current positions of the various rods 60.

The controller 112 may also be configured to compare the determined position differential to a corresponding differential threshold defined for the hydraulic system. In general, when the monitored position differential between the positions of the rods 60 exceeds the differential threshold, the controller 112 may determine that the actuators 44A-D are out-of-phase. In several embodiments, when such a determination is made, the controller 112 may be configured to initiate one or more control actions. For example, in one embodiment, the controller 112 may be configured to transmit a notification to the operator of the implement 10 (e.g., by causing a visual or audible notification or indicator to be presented to the operator) that provides an indication that the actuators 44A-D are out-of-phase. In such instance, the operator may then choose to initiate any suitable corrective action he/she believes is necessary.

Additionally, in several embodiments, when the monitored position differential exceeds the differential threshold, the controller 112 may be configured to automatically initiate a flow of fluid to the actuators 44A-D intended to rephase the actuators 44A-D. For example, in one embodiment, the controller 112 may be configured to transmit control signals (e.g., as indicated by dashed line 120 in FIG. 3) to the PRV 102 instructing the PRV 102 to open, thereby permitting a volume of fluid to flow from the reservoir 68 through the first fluid conduit 66 to the cap-side chamber 62 of the actuator 44A. This fluid flow, in turn, may cause all of the rods 60 of the actuators 44A-D to fully extend or retract such that the positions of the rods 60 are synchronized.

While the fluid is being provided to the actuators 44A-D, the controller 112 may be configured to continue to monitor the position differential between the positions of the various rods 60 of the actuators 44A-D. Specifically, in several embodiments, once the PRY 102 permits fluid to flow to the actuator 44A, the controller 112 may be configured to determine if the position differential changes (e.g., decreases) before a predetermined time period has elapsed. If the differential changes before expiration of the time period, it may be determined that the various components of the implement 10 and associated system 100 are functioning properly. In such instances, the controller 112 may be configured to maintain the flow of fluid to the first actuator 44A, such as by sending control signals 120 that instruct the PRV 102 to remain open, until the position differential falls below the differential threshold, thereby indicating that actuators 44A-D have been rephased. Additionally, in one embodiment, the controller 112 may be configured to transmit a notification to the operator of the implement 10 (e.g., by causing a visual or audible notification or indicator to be presented to the operator) that provides an indication that the actuators 44A-D have been successfully rephased. In a further embodiment, the controller 112 may be configured to maintain the flow of fluid to the first actuator 44A for a predetermined time period after the position differential falls below the differential threshold so as to ensure that all air is removed from the actuators 44A-D and various fluid conduits 66, 70, 72, 74, 76.

However, if the differential remains constant throughout the predetermined time period following initiation of the fluid flow, it may be determined that one or more component(s) of the implement 10 and/or the system 100 are not properly functioning. For example, the PRV 102 may not be functioning properly (e.g., the PRV 102 may be stuck shut) or one of the actuators 44A-D or the conduits 66, 70, 72, 74, 76 may be leaking. In such instances, the controller 112 may be configured to initiate a control action associated with terminating the rephasing process to prevent damage to the implement 10 and/or the system 100. For example, in several embodiments, the controller 112 may be configured to occlude or otherwise lock out the flow of fluid from the reservoir 68 to the actuators 44A-D, such as by closing the PRV 102 or another suitable valve. Additionally, in one embodiment, the controller 112 may be configured to transmit a notification to the operator of the implement 10 (e.g., by causing a visual or audible notification or indicator to be presented to the operator) that provides an indication that the rephasing operation failed and/or that a subsequent operation will need to be performed to rephrase the actuators. The notification or indicator may also provide an indication that maintenance or service may be required to address any issues associated with the component(s) preventing the rephasing process from being completed.

Figure 5:
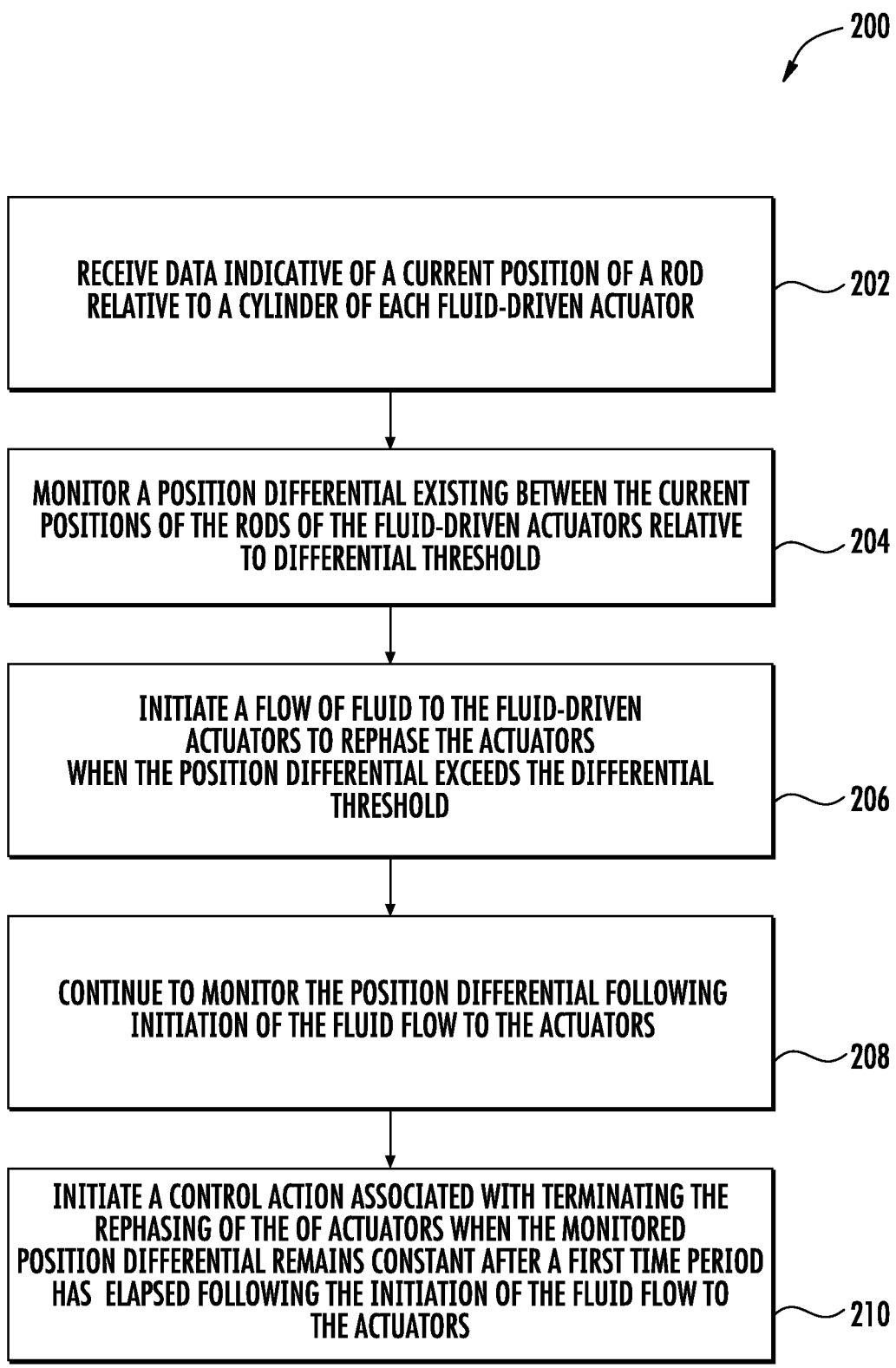
FIG. 5 illustrates a flow diagram of one embodiment of a method for rephasing fluid-driven actuators of an agricultural implement in accordance with aspects of the present subject matter.

Referring now to FIG. 5, a flow diagram of one embodiment of a method 200 for rephasing fluid-driven actuators of an agricultural implement is illustrated in accordance with aspects of the present subject matter. In general, the method 200 will be described herein with reference to the implement 10 and the system 100 described above with reference to FIGS. 1-4. However, it should be appreciated by those of ordinary skill in the art that the disclosed method 200 may generally be utilized to rephase fluid-driven actuators on any agricultural implement having any suitable implement configuration. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 5, at (202), the method 200 may include receiving data indicative of a current position of a rod relative to a cylinder for each fluid-driven actuator. For instance, as indicated above, the controller 112 may be communicatively coupled to various sensors 104, with each sensor 104 being configured to monitor the current position of the rod 60 relative to the associated cylinder 56 for one of the actuators 44A-D. As such, measurement signals or sensor data 116 transmitted from the sensors 104 may be received by the controller 112 for monitoring the current positions of the rods 60 of the actuators 44A-D.

At (204), the method 200 may include monitoring a position differential existing between the current positions of the rods of the fluid-driven actuators relative to a differential threshold. For example, the controller 112 may be configured to compare the current positions of the rods 60 of the various actuators 44A-D to determine the position differential existing between such rod positions. The controller 112 may then be configured to compare the determined position differential to the associated differential threshold. As indicated above, the plurality of fluid-driven actuators may be out-of-phase when the monitored position differential exceeds the differential threshold.

Moreover, as shown in FIG. 5, at (206), the method 200 may include initiating a flow of fluid to the fluid-driven actuators to rephrase the actuators when the monitored position differential exceeds the differential threshold. For instance, in the event that the position differential exceeds the differential threshold, the controller 112 may be configured to transmit control signals 118 to the PRV 102 instructing the PRV 102 to permit fluid to flow from the reservoir 68 through the first fluid conduit 66 to actuator 44A. As described above, this fluid flow may be intended to rephase the actuators 444-D.

Additionally, at (208), the method 200 may include continuing to monitor the position differential following initiation of the fluid flow to the actuators. For instance, once the PRV 102 initiates the fluid flow to the actuator 44A, the controller 112 may be configured to continue to monitor the position differential existing between the rods 60 of the actuators 44A-D.

Furthermore, at (210), the method 200 may include initiating a control action associated with terminating the rephasing of the actuators when the monitored position differential remains constant after a first time period has elapsed following the initiation of the fluid flow to the actuators. For example, in such instances, the controller 112 may be configured to occlude the flow of fluid to the actuators 44A-D, such as by closing the PRV 102.

This written description uses examples to disclose the technology, including the best anode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A system for rephasing fluid-driven actuators, the system comprising:
   an agricultural implement including a plurality of fluid-driven actuators fluidly coupled together in series, each fluid-driven actuator including a cylinder and a rod movable relative to the cylinder;
   a plurality of sensors, each sensor being provided in operative association with one of the fluid-driven actuators, each sensor being configured to detect a parameter indicative of a current position of the rod relative to the cylinder of the associated fluid-driven actuator;
   a controller communicatively coupled to the sensors, the controller being configured to:
      monitor a position differential existing between the current positions of the rods of the fluid-driven actuators relative to a differential threshold based on sensor measurements provided by the sensors, the fluid-driven actuators being out-of-phase when the monitored position differential exceeds the differential threshold;
      initiate a flow of fluid to the fluid-driven actuators to rephase the fluid-driven actuators when the monitored position differential exceeds the differential threshold;
      continue to monitor the position differential following initiation of the flow of fluid to the fluid-driven actuators; and
      implement a control action associated with terminating the rephasing of the fluid driven actuators when the monitored position differential remains constant and above the differential threshold after a first time period has elapsed following initiation of the flow of fluid.

2. The system of claim 1, wherein the control action is associated with occluding the flow of fluid to the fluid-driven actuators.

3. The system of claim 1, wherein, when the monitored position differential decreases before the first time period has elapsed, the controller is further configured to maintain the flow of fluid to the fluid-driven actuators until the monitored position differential falls below the differential threshold.

4. The system of claim 3, wherein the controller is further configured to notify an operator of the implement that the fluid-driven actuators have been rephased when the monitored position differential falls below the differential threshold.

5. The system of claim 3, wherein the controller is further configured to maintain the flow of fluid to the fluid-driven actuators after the monitored position differential falls below the differential threshold for a second time period.

6. The system of claim 1, wherein the sensors correspond to a plurality of linear sensors.

7. The system of claim 1, wherein the sensors correspond to a plurality of rotary sensors.

8. The system of claim 1, wherein the controller is further configured to notify an operator of the implement that the fluid-driven actuators are out-of-phase when the monitored position differential exceeds the differential threshold.

9. The system of claim 1, wherein one of the fluid-driven actuators is coupled between a wheel assembly of the agricultural implement and a frame of the agricultural implement.

10. The system of claim 1, wherein the fluid-driven actuators correspond to a plurality of hydraulic actuators.

11. A method for rephasing fluid-driven actuators of an agricultural implement, the agricultural implement including a plurality of fluid-driven actuators fluidly coupled together in series, each fluid-driven actuator including a cylinder and a rod movable relative to the cylinder, the method comprising:
   receiving, with a computing device, data indicative of a current position of the rod relative to the cylinder of each fluid-driven actuator;
   monitoring, with the computing device, a position differential existing between the current positions of the rods of the fluid-driven actuators relative to differential threshold, the plurality of fluid-driven actuators being out-of-phase when the monitored position differential exceeds the differential threshold;
   initiating, with the computing device, a flow of fluid to the fluid-driven actuators to rephase the fluid-driven actuators when the monitored position differential exceeds the differential threshold;
   continuing to monitor, with the computing device, the position differential following initiation of the flow of fluid to the fluid-driven actuators; and
   initiating, with the computing device, a control action associated with terminating the rephasing of the fluid-driven actuators when the monitored position differential remains constant and above the differential threshold after a first time period has elapsed following initiation of the flow of fluid.

12. The method of claim 11, wherein the control action is associated with occluding the flow of fluid to the fluid-driven actuators.

13. The method of claim 11, further comprising:
maintaining, with the computing device, the flow of fluid to the fluid-driven actuators until the monitored position differential falls below the differential threshold when the monitored position differential decreases before the first time period has elapsed.

14. The method of claim 13, further comprising:
notifying, with the computing device, an operator of the implement that the fluid-driven actuators have been rephased when the monitored position differential falls below the differential threshold.

15. The method of claim 13, further comprising:
maintaining, with the computing device, the flow of fluid to the fluid-driven actuators after the monitored position differential falls below the differential threshold for a second period of time.

16. The method of claim 11, further comprising:
notifying, with the computing device, an operator of the implement that the fluid-driven actuators are out-of-phase when the monitored position differential exceeds the differential threshold.

17. The method of claim 11, wherein one of the fluid-driven actuators is coupled between a wheel assembly of the agricultural implement and a frame of the agricultural implement.

18. The method of claim 11, wherein the fluid-driven actuators correspond to a plurality of hydraulic actuators.

* * * * *